(12) United States Patent
Francois et al.

(10) Patent No.: US 8,808,413 B2
(45) Date of Patent: Aug. 19, 2014

(54) ABRASIVE TOOL HAVING CONTROLLED POROSITY DISTRIBUTION

(75) Inventors: Emmanuel C. Francois, Sterling, MA (US); Konstantin S. Zuyev, Grafton, MA (US); Muthu Jeevanantham, Worcester, MA (US); Anne M. Bonner, Nashua, NH (US); Michael W. Klett, Holden, MA (US); Dean S. Matsumoto, Worcester, MA (US)

(73) Assignees: Saint-Gobain Abrasives, Inc., Worcester, MA (US); Saint-Gobain Abrasifs, Conflans-Sainte-Honorine (FR)

(*) Notice: Subject to any disclaimer, the term of this patent is extended or adjusted under 35 U.S.C. 154(b) by 165 days.

(21) Appl. No.: 12/849,674

(22) Filed: Aug. 3, 2010

(65) Prior Publication Data

US 2011/0027564 A1    Feb. 3, 2011

Related U.S. Application Data

(60) Provisional application No. 61/230,941, filed on Aug. 3, 2009.

(51) Int. Cl.
*B24D 3/02* (2006.01)
*C09C 1/68* (2006.01)
*C09K 3/14* (2006.01)
*B24D 5/06* (2006.01)
*B24D 5/08* (2006.01)
*B32B 3/26* (2006.01)

(52) U.S. Cl.
CPC *B24D 5/066* (2013.01); *B24D 5/08* (2013.01); *B32B 3/26* (2013.01)

USPC ........ 51/307; 428/157; 428/220; 428/304.4; 428/314.2

(58) Field of Classification Search
None
See application file for complete search history.

(56) References Cited

U.S. PATENT DOCUMENTS 1,975,070 A * 10/1934 Benner et al. ............. 451/544
2,808,688 A * 10/1957 MacMaster ................ 51/297

(Continued)

FOREIGN PATENT DOCUMENTS

| JP | 02-053568 A | 2/1990 |
| JP | 2001260034 A | 9/2001 |
| JP | 2003181762 A | 7/2003 |
| JP | 2003191170 A | 8/2003 |

OTHER PUBLICATIONS

U.S. Appl. No. 12/849,678, filed Aug. 3, 2010, Inventors: Emmanuel C. Francois et al.

(Continued)

*Primary Examiner* — Kaj K Olsen
*Assistant Examiner* — Ross J Christie
(74) *Attorney, Agent, or Firm* — Abel Law Group, LLP; Joseph P. Sullivan

(57) ABSTRACT

An abrasive tool having a body including an abrasive portion having abrasive grains contained within a matrix material and porosity characterized by a bimodal distribution of pores including large pores having an average large pore size ($P_l$) and small pores having an average small pore size ($P_s$), wherein $P_l > P_s$. The body of the abrasive tool further includes a first reinforcing member contained within the abrasive portion, and a percent thermal expansion over a temperature range for 25° C. to 450° C. of not greater than about 0.7%.

20 Claims, 4 Drawing Sheets

(56) References Cited

U.S. PATENT DOCUMENTS

| | | | | |
|---|---|---|---|---|
| 2,880,080 A | * | 3/1959 | Rankin et al. | 51/297 |
| 3,030,743 A | * | 4/1962 | Raymond | 51/297 |
| 3,146,560 A | * | 9/1964 | Hurst | 51/293 |
| 3,190,045 A | * | 6/1965 | Zuzelo | 451/548 |
| 3,248,824 A | * | 5/1966 | Zuzelo | 451/548 |
| 3,315,418 A | * | 4/1967 | Zawodni et al. | 451/546 |
| 3,400,497 A | * | 9/1968 | Shoemaker | 451/548 |
| 3,401,491 A | * | 9/1968 | Schnabel et al. | 51/295 |
| 3,427,759 A | * | 2/1969 | Rue et al. | 451/546 |
| 3,730,808 A | * | 5/1973 | Fekete et al. | 156/332 |
| 3,838,543 A | * | 10/1974 | Lakhani | 451/546 |
| 3,867,795 A | * | 2/1975 | Howard | 451/548 |
| 3,868,793 A | * | 3/1975 | Corcoran et al. | 451/548 |
| 4,226,602 A | * | 10/1980 | Fukuda | 51/296 |
| 5,037,453 A | * | 8/1991 | Narayanan et al. | 51/307 |
| 5,160,509 A | * | 11/1992 | Carman et al. | 51/307 |
| 5,221,294 A | * | 6/1993 | Carman et al. | 51/296 |
| 5,674,122 A | * | 10/1997 | Krech | 51/298 |
| 5,738,696 A | | 4/1998 | Wu | |
| 5,738,697 A | * | 4/1998 | Wu et al. | 51/296 |
| 5,752,876 A | * | 5/1998 | Hettes | 451/463 |
| 5,913,994 A | | 6/1999 | Avril et al. | |
| 6,086,648 A | | 7/2000 | Rossetti, Jr. et al. | |
| 6,440,185 B2 | | 8/2002 | Nagata et al. | |
| 6,679,758 B2 | | 1/2004 | Bright et al. | |
| 6,702,650 B2 | | 3/2004 | Adefris | |
| 6,749,496 B2 | | 6/2004 | Mota et al. | |
| 7,077,723 B2 | | 7/2006 | Bright et al. | |
| 7,275,980 B2 | | 10/2007 | Bonner et al. | |
| 7,422,513 B2 | | 9/2008 | Bright et al. | |
| 7,520,800 B2 | * | 4/2009 | Duescher | 451/527 |
| 2001/0000838 A1 | | 5/2001 | Nagata et al. | |
| 2002/0081952 A1 | * | 6/2002 | Fritz et al. | 451/56 |
| 2003/0097800 A1 | * | 5/2003 | Ramanath et al. | 51/309 |
| 2003/0175488 A1 | * | 9/2003 | Asthana et al. | 428/212 |
| 2003/0194947 A1 | * | 10/2003 | Bright et al. | 451/28 |
| 2003/0232586 A1 | * | 12/2003 | Ramanath et al. | 451/540 |
| 2004/0235406 A1 | * | 11/2004 | Duescher | 51/300 |
| 2005/0032469 A1 | * | 2/2005 | Duescher | 451/548 |
| 2005/0101225 A1 | * | 5/2005 | Bright et al. | 51/298 |
| 2005/0101237 A1 | | 5/2005 | Vecchiarelli et al. | |
| 2006/0160476 A1 | * | 7/2006 | Bright et al. | 51/293 |
| 2006/0205875 A1 | * | 9/2006 | Cha et al. | 525/88 |
| 2008/0085660 A1 | * | 4/2008 | Orlhac | 451/28 |
| 2008/0293345 A1 | * | 11/2008 | Bright et al. | 451/540 |
| 2009/0205259 A1 | * | 8/2009 | Burzynski et al. | 51/295 |

OTHER PUBLICATIONS

PCT/US2010/044293, International Search Report mailed Mar. 2, 2011.

PCT/US2010/044295, International Search Report mailed Apr. 1, 2011.

* cited by examiner

ABRASIVE TOOL HAVING CONTROLLED POROSITY DISTRIBUTION

CROSS-REFERENCE TO RELATED APPLICATION(S)

The present application claims priority from U.S. Provisional Patent Application No. 61/230,941, filed Aug. 3, 2009, entitled "Abrasive Tool Having Controlled Porosity Distribution," naming inventors Emmanuel C. Francois, Konstantin S. Zuyev, Muthu Jeevanantham, Anne M. Bonner, Michael W. Klett and Dean Matsumoto, which application is incorporated by reference herein in its entirety.

BACKGROUND

1. Field of the Disclosure

The following is directed to an abrasive tool, and particularly directed to an abrasive tool having a particular porosity distribution.

2. Description of the Related Art

Abrasive wheels are typically used for cutting, abrading, and shaping of various materials, such as stone, metal, glass, plastics, among other materials. Generally, the abrasive wheels can have various phases of materials including abrasive grains, a bonding agent, and some porosity. Depending upon the intended application, the abrasive wheel can have various designs and configurations. For example, for applications directed to the finishing and cutting of metals, some abrasive wheels are fashioned such that they have a particularly thin profile for efficient cutting.

However, given the application of such wheels, the abrasive articles are subject to fatigue and failure. In fact, the wheels may have a limited time of use of less than a day depending upon the frequency of use. Accordingly, the industry continues to demand abrasive wheels capable of improved performance.

SUMMARY

According to one aspect, an abrasive tool having a body including an abrasive portion having abrasive grains contained within a matrix material and porosity characterized by a bimodal distribution of pores including large pores having an average large pore size ($P_l$) and small pores having an average small pore size ($P_s$), wherein $P_l > P_s$. The body of the abrasive tool further includes a first reinforcing member contained within the body, and a percent thermal expansion over a temperature range for 25° C. to 450° C. of not greater than about 0.7%.

According to another aspect, an abrasive tool includes a body having an abrasive portion including abrasive grains contained within a matrix material and porosity characterized by a bimodal pore size distribution including large pores having an average large pore size ($P_l$) and small pores having an average small pore size ($P_s$), wherein $P_l > P_s$. The body of the abrasive tool further includes a first reinforcing member contained within the body, wherein the body has an aspect ratio defined as a ratio between diameter to thickness of at least about 10:1.

In yet another aspect, an abrasive tool includes a body having an abrasive portion including abrasive grains contained within a matrix material, wherein the abrasive portion comprises a bimodal distribution of pores including large pores having an average large pore size ($P_l$) and small pores having an average small pore size ($P_s$), wherein $P_l > P_s$, and wherein the matrix material comprises at least about 60 vol % organic material. The body further includes a first reinforcing member contained within the body.

According to another aspect, an abrasive tool has a body including an abrasive portion comprising abrasive grains contained within a matrix material, large pores, and small pores, wherein the large pores have an average large pore size ($P_l$) and the small pores have an average small pore size ($P_s$), and the percent difference between the average large pore size and average small pore size is at least 25% based on the equation $((P_l - P_s)/P_l) \times 100)$ wherein $P_l > P_s$. The body of the abrasive tool further includes a first reinforcing member contained within the body, and a percent increase G-ratio of at least about 15% over conventional abrasive tools, wherein the percent increase is based on the equation $((G_N - G_C)/G_C) \times 100)$, wherein $G_N$ represents the G-ratio of an abrasive tool having large pores and small pores and $G_C$ represents the G-ratio of a conventional abrasive tool.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

The following is directed to abrasive tools utilizing abrasive portions of abrasive grains contained within a matrix material for cutting, abrading, and finishing of workpieces. Certain embodiments herein are directed to large-diameter abrasive wheels incorporating one or more reinforcing members within the body of the tool that are particularly suited for cutting and/or shaping metal.

Figure 1:
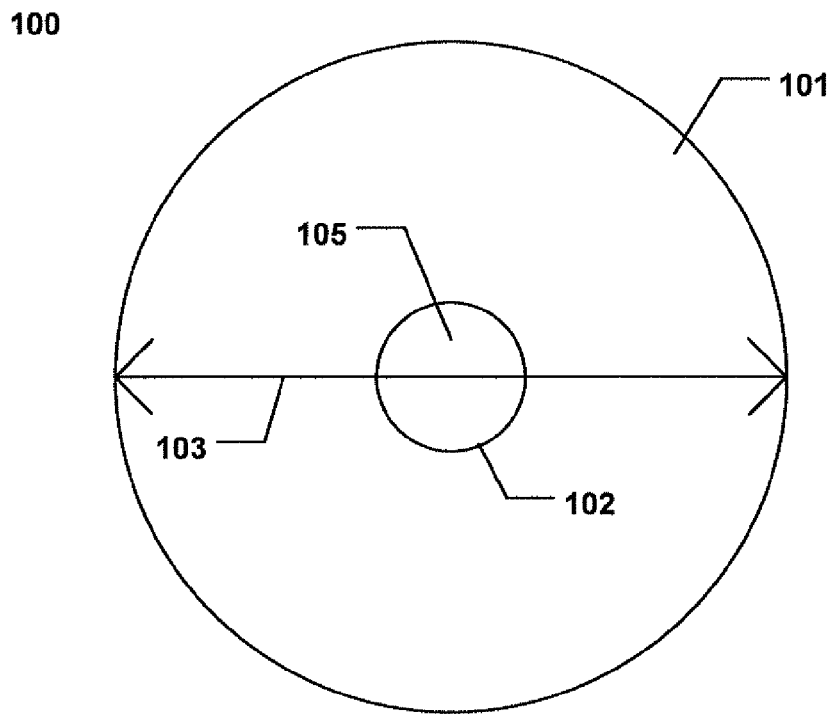
FIG. 1 includes an illustration of an abrasive tool in accordance with an embodiment.

FIG. 1 includes an illustration of an abrasive tool in accordance with an embodiment. Notably, the abrasive tool 100 includes a body 101 having a generally circular shape as viewed in two dimensions. It will be appreciated, that in three-dimensions the tool has a certain thickness such that the body 101 has a disk-like or a cylindrical shape. As illustrated, the body can have an outer diameter 103 extending through the center of the tool, which can be particularly large, having a dimension of at least about 45 cm. In other applications, the body 101 can have an outer diameter 103, such as on the order of at least about 60 centimeters, at least about 75 centimeters, or even at least 100 centimeters. Particular abrasive tools utilize a body 101 having an outer diameter 103 within a range between 45 centimeters and about 200 centimeters, such as between 45 cm and about 175 cm, and more particularly between about 45 centimeters and about 150 centimeters.

As further illustrated, the abrasive tool 100 can include a central opening 105 defined by an inner circular surface 102 about the center of the body 101. The central opening 105 can extend through the entire thickness of the body 101 such that the abrasive tool 100 can be mounted on a spindle or other machine for rotation of the abrasive tool 100 during operation.

Figure 2:
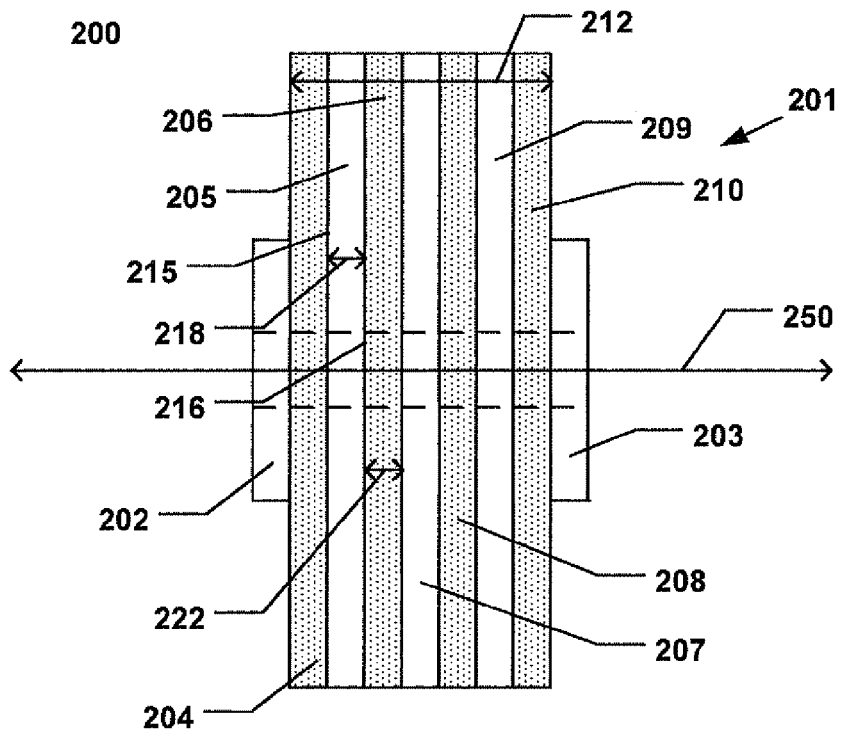
FIG. 2 includes a cross-sectional illustration of a portion of an abrasive tool in accordance with an embodiment.

FIG. 2 includes a cross-sectional illustration of a portion of an abrasive tool in accordance with an embodiment. The abrasive body 201 can be a composite article including a combination of portions of different types of material. In particular, the body 201 can include abrasive portions 204, 206, 208, and 210 and reinforcing members 205, 207, and 209. The abrasive tool 200 can be designed such that the reinforcing members 205, 207, and 209 can be placed within the body such that they are spaced apart from each other, and therein, separate each of the abrasive portions 204, 206, 208, and 210 from each other. That is, the abrasive tool 200 can be formed such that the reinforcing members 205, 207, and 209 are spaced apart from each other laterally through the thickness 212 of the body 201 and separated by abrasive portions 206 and 208. As will be appreciated, in such a design the abrasive portions 206 and 208 can be disposed between the reinforcing members 205, 207, and 209.

As further illustrated, the reinforcing members 205, 207, and 209 can be substantially planar members having first planar faces and second planar faces. For example, the reinforcing member 205 can be formed such that it is a planar member having a first major surface 215 and a second major surface 216. Moreover, the body 201 can have a design such that the abrasive portions 204, 206, 208, and 210 can overlie the major surface of the reinforcing members 205, 207, and 209. For example, the abrasive portion 204 can overlie the first major surface 215 of the reinforcing member 205 and the abrasive portion 206 overlies the second major surface 216 of the reinforcing member 205. In particular instances, the body 201 can be formed such that the abrasive portions 204 and 206 cover essentially the entire surface area of the first major surface 215 and second major surface 216, respectively. Accordingly, the abrasive portions 204 and 206 can directly contact (i.e. abut) the reinforcing member 205 on either sides at the first and second major surfaces 215 and 216.

Notably, the abrasive body 201 can be designed such that the reinforcing members 205, 207, and 209 can extend through a majority of the diameter 103 of the body 201. In particular instances, the reinforcing members 205, 207, and 209 can be formed such that they extend through at least about 75%, such as at least about 80%, or even the entire diameter 103 of the body 201.

In accordance with an embodiment, the body 201 is formed such that it can have an average thickness 212 measured in a direction parallel to the axial axis 250 extending through the center of the central opening 105. The average thickness 212 of the body 201 can be particularly thin such that it is suitable for cutting metal workpieces. For example, the average thickness of the body 201 can be not greater than about 3 centimeters. In other embodiments, the average thickness 212 of the body 201 can be not greater than about 2.5 centimeters, such as not greater than about 2 centimeters, or even not greater than about 1.5 centimeters. Still, certain embodiments may utilize an average thickness 212 within a range between about 0.5 centimeters and about 3 centimeters, such as between about 0.5 centimeters and about 2 centimeters.

The abrasive articles of the embodiments herein can have a particular aspect ratio defined as the ratio between the outer diameter 103 to the average thickness 212 of the body 201. According to certain designs, the aspect ratio is at least about 10:1, such as at least about 20:1, at least about 50:1, or even at least about 75:1. Certain embodiments utilize an aspect ratio within a range between about 10:1 and about 125:1, such as between about 20:1 and about 125:1.

In further reference to the reinforcing members 205, 207, and 209, such members can be made of an organic material, inorganic material, and a combination thereof. For example, the reinforcing members 205, 207, and 209 can be made of an inorganic material, such as a ceramic, a glass, quartz, or a combination thereof. Particularly suitable materials for use as the reinforcing members 205, 207, and 209 can include glass materials, incorporating fibers of glass materials, which may include oxide-based glass materials.

Some suitable organic materials for use in the reinforcing members 205, 207, and 209 can include phenolic resin, polyimides, polyamides, polyesters, aramids, and a combination thereof. For example, in one particular embodiment, the reinforcing members 205, 207, and 209 can include Kevlar™, a particular type of aramid.

Additionally, the reinforcing members 205, 207, and 209 can include a fibrous material having a coating overlying and bonded directly to the external surfaces of the fibers. The coating can be an organic material, inorganic material, or a combination thereof. Certain abrasive tools can use reinforcing members 205, 207, and 209 utilizing fibers having a coating of an organic material, which may be a natural organic material or a synthetic organic material, such as a polymer, which may aid bonding between the reinforcing member and the abrasive portion. Some suitable organic coating materials can include resins, which may be thermosets, thermoplastics, or a combination thereof. Particularly suitable resins can include phenolics, epoxies, polyesters, cyanate esters, shellacs, polyurethanes, and a combination thereof. In one particular instance, the abrasive tool incorporates a reinforcing member comprising phenolic resin-coated glass fibers.

The reinforcing members 205, 207, and 209 can include a plurality of fibers that are woven together. The fibers can be woven or stitched together in a variety of manners. In certain instances, the reinforcing members can be woven together such that a patterns is formed, including fibers extending primarily in two perpendicular directions.

The reinforcing members 205, 207, and 209 can have an average thickness 218 that is defined as the distance between the first major surface 215 and the second major surface 216 of the reinforcing member 205. The average thickness 218 can be less than 0.6 centimeters, such as less than 0.6 centimeters, or even less than 0.4 centimeters.

In relative percentages, depending upon the design of the abrasive article, the reinforcing members can be formed to have certain dimensions such that they compose a certain percentage of the total average thickness of the body. For example, the reinforcing member 205 can have an average thickness 218 that is at least about 3% of the total average thickness 212 of the body 201. In other instances, the reinforcing member 205 can have an average thickness 218 that is at least about 5%, such as at least about 8%, or even at least about 10% of the total average thickness 212 of the body 201. Certain reinforcing members can have an average thickness 218 that is within a range between about 3% and about 15% of the total average thickness 212 of the body 201.

In accordance with embodiments herein, the abrasive tool 200 is formed such that the body 201 includes abrasive portions 204, 206, 208, and 210. Reference will be made in the following paragraphs to the abrasive portion 204, however it will be appreciated that all of the identified abrasive portions can include the same features. The abrasive portion 204 can be a composite material having abrasive grains contained within a matrix material and further comprising a particular composition and type of porosity.

The abrasive grains can include a particularly hard material suitable for abrading and material removal applications. For example, the abrasive grains can have a Vickers hardness of at least about 5 GPa. The hardness of the abrasive grains can be greater in some tools, such that the abrasive grains have a Vickers hardness of at least about 10 GPa, at least about 20 GPa, at least about 30 GPa, or even at least about 50 GPa.

The abrasive grains can include an inorganic material. Some suitable inorganic materials can include oxides, carbides, borides, nitrides, and a combination thereof. For example, the abrasive portion 204 can be formed to include abrasive grains consisting essentially of oxides. Particularly suitable oxides can include alumina, zirconia, silica, and a combination thereof. Some designs can utilize abrasive grains that consist essentially of alumina. Other designs may utilize abrasive grains that incorporate a combination of alumina and/or alumina-zirconia alloys, however in such formulations a greater percentage of abrasive grains may be formed of alumina material than the alumina-zirconia alloy material.

Furthermore, certain abrasive tools may utilize a superabrasive material as the abrasive grains. Superabrasive materials can include diamond, cubic boron nitride, and a combination thereof. In one certain embodiment, the abrasive grains consist essentially of diamond.

The abrasive portions 204, 206, 208, and 210 can be formed such that the abrasive grains are contained within and surrounded by a matrix material to secure the abrasive grains in place for cutting and grinding operations. Generally, the abrasive portions 204, 206, 208, and 210 can be formed such that at least about 40 vol % of the total volume of the abrasive portion includes abrasive grains. In other embodiments, the abrasive grain content within the abrasive portion can be higher, such as on the order of at least about 44 vol %, such as at least about 50 vol %, or even at least about 54 vol % of the total volume of the abrasive portion. Particular embodiments utilize an abrasive portion having between about 40 vol % and 60 vol %, more particularly between about 40 vol % and about 54 vol % abrasive grains. In fact, in one instance, the abrasive portion is made of between about 42 vol % and about 50 vol % abrasive grains of the total volume of the respective abrasive portion.

Generally, the abrasive portion 204 is formed such that at least about 30 vol % of the total volume percent of the abrasive portion is matrix material. In other embodiments, the abrasive portion 204 comprises a greater content of matrix material, such as on the order of at least about 40 vol %, at least about 42 vol %, at least about 4445 vol %, or even at least about 46 vol %. Still, embodiments herein may utilize an amount of matrix material within a range between about 30 vol % and about 56 vol %, such as on the order of between about 30 vol % and about 50 vol %, or between about 40 vol % and about 48 vol %.

Embodiments herein can utilize a matrix material that can include an organic material that may function as the primary bonding component. Such organic materials may include natural organic materials, synthetic organic materials, and a combination thereof. In particular instances, the organic material can be made of a resin, which may include thermosets, thermoplastics, and a combination thereof. For example, some suitable resins can include phenolics, epoxies, polyesters, cyanate esters, shellacs, polyurethanes, rubber and a combination thereof. esters In particular instances, the matrix material can be formed such that it comprises a majority amount of the organic material. For example, at least about 65 vol % of the total volume of matrix material can be formed of organic bond material. In other abrasive portions, the content of organic material within the matrix material may be greater, such as at least about 70 vol %, or even at least about 75 vol %. Still, certain embodiments utilize a matrix material having an organic bond material content within a range between about 60 vol % and about 85 vol %, such as between about 65 vol % and about 80 vol %.

The abrasive portions herein may also include filler materials incorporated within the abrasive portion. Certain filler materials may be incorporated as chemically reactive agents intended to react with the surface being shaped. Other filler materials may include moisture absorbers, binders, and various other materials that facilitate the forming process. In accordance with one embodiment, the filler material can be a pore-forming material, such as microspheres that facilitate the formation of certain types of porosity within the final-formed abrasive article.

As further illustrated in FIG. 2, the body can be formed such that it incorporates reinforcing members 202 and 203 that abut the outer surfaces of the abrasive portions 204 and 210 about the central opening 105. In certain designs, the reinforcing members 202 and 203 can extend for a portion of the outer diameter 103, such as half the outer diameter 103 of the abrasive body 201. Provision of the reinforcing members 202 and 203 about the central opening 105 facilitates reinforcement of the body 201 at a location where the abrasive tool 200 is intended to be affixed to a spindle or machine. As will be appreciated, the reinforcing members 202 and 203 can have the same features as the reinforcing members 205, 207, and 209.

Figure 3:
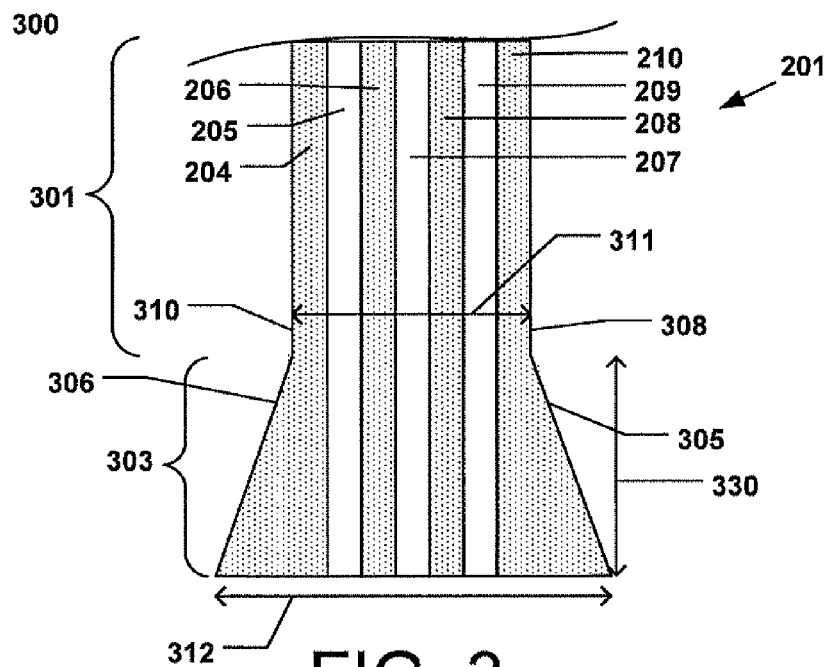
FIG. 3 includes a cross-sectional illustration of a portion of an abrasive tool in accordance with an embodiment.

FIG. 3 includes a cross-sectional illustration of a portion of an abrasive tool in accordance with an embodiment. The portion of the illustrated abrasive tool 300 includes an outer circumference of an abrasive tool formed in accordance with an embodiment. Particularly, the portion of the abrasive tool 300 can have a body 201 including abrasive portions 204, 206, 208, and 210 previously described. Moreover, the abrasive body 201 includes reinforcing members 205, 207, and 209 disposed between the abrasive portions 204, 206, 208, and 210 as previously described.

Notably, the body 201 is formed such that it has a flat region 301 proximate to the center of the wheel and surrounding the central opening 105, and a tapered region 303 at the outer edge of the body 201. As illustrated, the tapered region 303 is formed such that it has an average thickness 312 measured at the outer diameter of the body 201 that is significantly greater than the average thickness 311 of the body 201 within the flat region 301. The formation of the tapered region 303 is facilitated by the extension of a tapered edge 305 of the abrasive portion 210 that extends at an angle to the external surface 308 of the flat region 301 of the abrasive portion 210. The tapered region 303 is further defined by a tapered surface 306 of the abrasive portion 204, which extends at an angle to the surfaces 310 of the abrasive portion 204. As illustrated, the tapered region 303 can form a rim around the outer diameter of the wheel, wherein the tapered surfaces 305 and 306 extend at an angle axially outward from the surfaces 308 and 310, respectively. The tapered surfaces 305 and 306 can extend at an angle to a radius extending from the center of the body substantially parallel to the surfaces 308 and 310, and moreover, the tapered surfaces 305 and 306 can extend at an angle to an axial axis 250 extending through the center of the body 201.

According to some embodiments, the tapered region 303 can extend circumferentially around a portion of a periphery of the body 201. Certain designs may utilize a tapered region 303 that extends throughout the entire circumference of the body 201. While reference is made herein to abrasive articles incorporating a tapered region 303, it will be appreciated, that a tapered region 303 may not necessarily be present for certain abrasive articles.

As illustrated, the tapered region 303 can extend radially from the flat region 301 of the body 201. Embodiments herein may form a tapered region 303 having a length 330, as measured in a direction parallel to a radius extending from the center of the body 201, which can be a particular percentage of the dimension of the outer diameter 103 of the body 201. For example, the tapered region 303 can have a length 330 that is at least about 5% of the dimension of the outer diameter 103. In other cases, depending upon the intended application, the body 201 can have a tapered region 303 having a length 330 of at least about 10%, such as at least about 15%, at least about 20%, at least about 30%, or even at least about 35%, of the dimension of the outer diameter 103. Particular embodiments can utilize a tapered region 303 wherein the length 330 is within a range between about 5% and about 50%, and particularly between about 5% and about 35%, or even more particularly between about 5% and about 20% of the outer diameter 103.

In other terms, the length 330 of the tapered region can be at least about 10 centimeters. In some embodiments, the length 330 of the tapered region 303 can be greater, such as at least about 13 centimeters, at least about 15 centimeters, or even at least about 20 centimeters. Still, particular embodiments herein can utilize a tapered region 303 having a length 330 within a range between about 10 centimeters and about 30 centimeters, such as between about 10 centimeters and about 20 centimeters.

Figure 4:
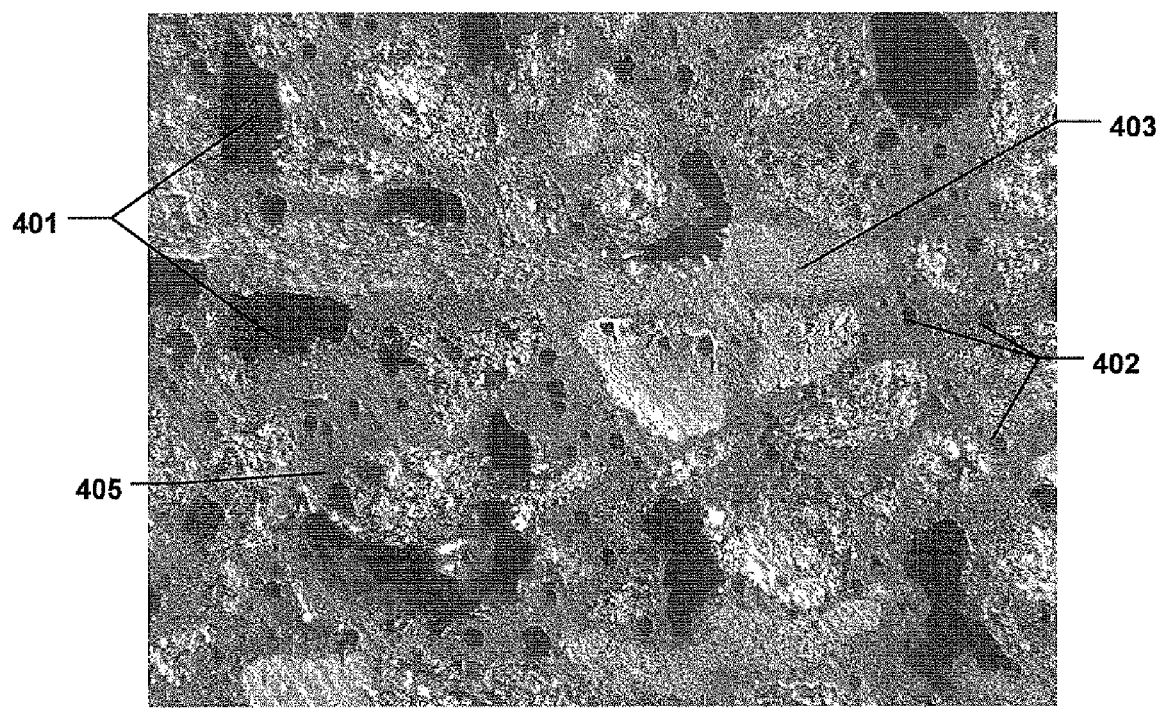
FIG. 4 includes an enlarge photo of a portion of an abrasive tool in accordance with an embodiment.
Figure 7:
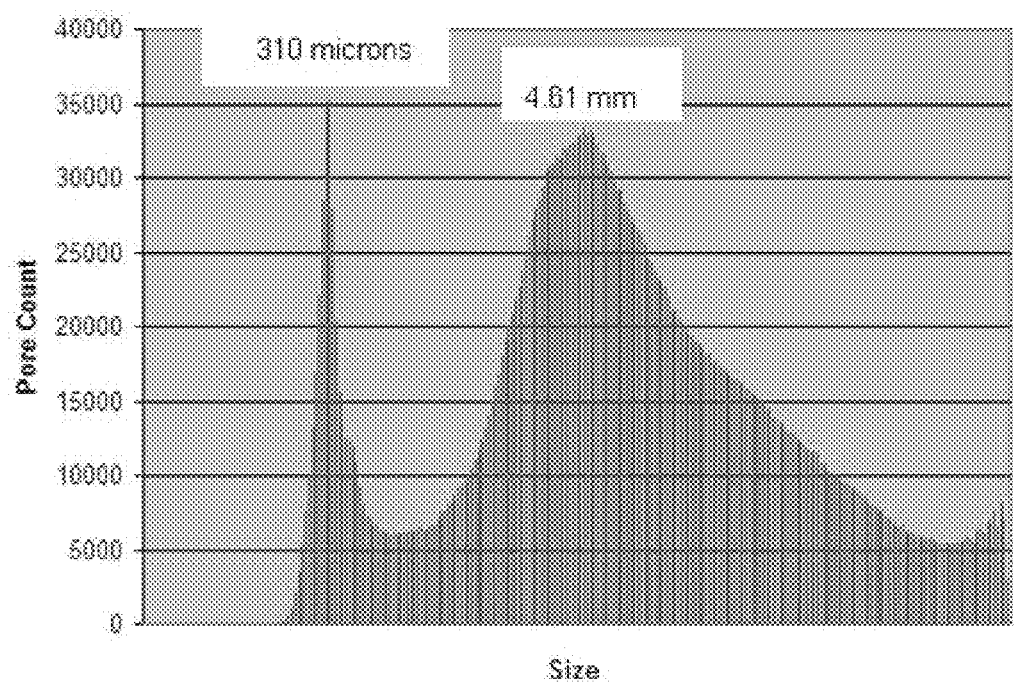
FIG. 7 includes a plot of pore size distribution for an abrasive tool according to an embodiment.

FIG. 4 includes an enlarged image of an abrasive portion from the abrasive tool in accordance with an embodiment. As illustrated in FIG. 4 the abrasive portion includes abrasive grains 403 contained within a matrix material 405. Moreover, the abrasive tool comprises an abrasive portion having a bimodal distribution of pores including large pores 401 having an average large pore size ($P_l$) and small pores 402 having an average small pore size ($P_s$), wherein $P_l$<$P_s$. Reference herein to a bimodal distribution of pores is reference to a continuous distribution having two distinct peaks or local maximas along the curve that are separated from each other. While certain strict definitions of a bimodal distribution may require that the means of each of the modes differ by at least twice the common standard deviation, however, this may not necessarily be the case for embodiments herein, and such embodiments may be a mixture of two unimodal distributions. Accordingly, the curves representing the distribution of pores according to embodiments herein can have two (or more) distinct peaks wherein each distinct peak is associated with a mean pore size of a type of porosity. FIG. 7 includes a plot of a pore size distribution curve generated from an abrasive article according to an embodiment herein. Notably, the pore size distribution demonstrates two distinct maximas and a bimodal pore size distribution according to embodiments herein.

The abrasive tools herein can utilize abrasive portions wherein the percent difference between the average large pore size and average small pore size is at least 25% based on the equation $((P_l-P_s)/P_l)\times 100$ wherein $P_l$>$P_s$. In other embodiments, the percent difference between the average large pore size ($P_l$) and the average small pore size ($P_s$) is greater, such as on the order of at least 30%, at least about 50%, at least 75%, or even at least about 90%. Certain abrasive tools in accordance with embodiments herein, can utilize a percent difference between the average large pore size and average small pore size that is within a range between about 75% and about 99%, such as between about 90% and about 99%. The features noted in the foregoing are based upon empirical data generated from measurements taken using enlarged, cross-sectional images of the microstructure of the abrasive tools according to embodiments. In particular, the size of the pores were measured by randomly selecting pores and measuring the largest dimension of the pore as viewed in cross-section.

Porosity measurements used to defined the embodiments herein were carried out using imaging software available as ImageJ free source software, which is capable of distinguishing porosity from other phases within the body, analyzing the magnified images of cross-sections of the abrasive tool, and calculating the amount of porosity for a particular area pictured. The process of analyzing the porosity of the abrasive tool, and more particularly determining the percentages of large pores and small pores and their average sizes can be completed using one or more images. In a single image providing a magnified cross-section of the abrasive tool, the large pores can be analyzed by digitally masking the small pores within the image and running the software. Using the same image, the small pores can be analyzed by digitally masking the large pores and running the software on the masked image. As such, for a given cross-sectional image, the software can calculate and analyze the large and small pores present in the body.

In other terms, the difference between the average large pore size ($P_l$) and average small pore size ($P_s$) can be at least one order of magnitude. That is, for example, the difference between the average large pore size and average small pore size can be at least two orders of magnitude, and more particularly between one order of magnitude and three orders of magnitude.

The small pores 402 can have an average small pore size ($P_s$) of not greater than about 0.70 mm. For example, the average small pore size can be not greater than about 0.65 mm, such as not greater than about 0.60 mm, or even not greater than about 0.50 mm. Particular embodiments may utilize small pores having an average small pore size within a range between about 0.01 mm and about 0.70 mm, such as between about 0.01 mm and about 0.65 mm, and more particularly between about 0.01 mm and about 0.60 mm.

In fact, the bimodal pore size distribution can be controlled such that at least about 80% of the small pores have a pore size within a range between about 0.01 mm and about 0.70 mm. In other instances, at least about 90% of the small pores have a pore size within a range between about 0.01 mm and about 0.70 mm, and more particularly at least about 95% of the small pores have a pore size within a range between about 0.01 mm and about 0.70 mm. Particular abrasive tools can be formed such that essentially all the small pores have a pore size within a range between about 0.01 mm and about 0.70 mm.

The small pores 402 may be formed by using pore formers within the matrix material 405. Suitable pore-forming materials can include organic and/or inorganic materials. For example, beads or microspheres of a certain material, such as a polymer material, a glass material, or ceramic material can be incorporated in the initial mixture, a portion of which can be volatilized during processing to leave a pore within the final-formed abrasive article. As such, a majority of the small pores can have a circular cross-sectional shape. In fact, in certain embodiments essentially all the small pores have a circular cross-sectional shape. The large pores 401 may be a result of natural porosity that may be produced during the forming process.

Moreover, according to embodiments herein, the large pores can have an average large pore size ($P_l$) of at least about 0.75 mm. In other embodiments, the large pores can have an average large pore size of at least about 0.80 mm, such as at least about 0.90 mm, at least about 1 mm, or even at least about 5 mm. Still, embodiments herein typically utilize large pores having an average large pore size ($P_l$) within a range between 0.75 mm and 10 mm, such as between 0.75 mm and 8 mm, and more particularly between about 0.8 mm and about 5 mm.

The large pores 401 may be further characterized by the fact that at least 80% of the large pores have a pore size within a range between about 0.75 mm and about 10 mm. For example, in more particular instances, at least about 90% of the large pores have a pore size within a range between 0.75 mm and 10 mm, such as on the order of at least 95% of the large pores have a pore size within a range between about 0.75 mm and about 10 mm. In fact, in certain embodiments essentially the entirety of all large pores have a pore size within a range between about 0.75 mm and about 10 mm.

Generally, the abrasive portions of the abrasive tools herein can have an average total porosity of at least 0.5 vol % of the total volume of the abrasive portion. In other instances, the percent porosity within the abrasive portion can be greater, such as at least about 1 vol %, such as at least about 5 vol %, at least about 8 vol %, at least about 10 vol %, at least about 12 vol %, at least about 15 vol %, or even at least about 20 vol %. Particular embodiments utilize abrasive portions having a percent porosity within a range between about 0.5 vol % and 30 vol %, such as between about 5 vol % and about 30 vol %, and particularly between about 8 vol % and 25 vol %.

The abrasive tools described herein can have particular features that make the abrasive tool suitable for improved grinding and/or cutting applications. Notably, the percent thermal expansion of the abrasive tools can be minimized. For example, the abrasive articles of embodiments herein demonstrate an improved percent thermal expansion as compared to conventional abrasive articles over a range of 25° C. to 450° C. Notably, for comparative purposes, the conventional abrasive articles included abrasives of the same design having the abrasive portion and reinforcing members. According to empirical evidence, the abrasive tools of the embodiments herein demonstrated a percent decrease in the percent thermal expansion of at least about 5% over conventional abrasive tools. The percent decrease is based on the equation (($TE_C - TE_N$)/$TE_C$)×100%), wherein $TE_N$ represents the thermal expansion of an abrasive tool according to embodiments herein and $TE_C$ represents the thermal expansion of a conventional abrasive tool. In other embodiments, the percent decrease of percent thermal expansion is at least about 10%, such as at least about 20%, at least about 50%, at least about 75%, or even at least about 100%. Particular embodiments demonstrate a percent decrease of thermal expansion within a range between about 5% and about 150%, and more particularly between about 5% and about 100%, and even more particularly between about 5% and about 75%. Such distinctions were demonstrate using standard thermo-mechanical analysis (TMA).

In more particular terms, the percent thermal expansion over a range of 25° C. to 450° C. for the abrasive tools herein is not greater than about 0.7%. It will be appreciated that the percent thermal expansion is a measure of linear thermal expansion of the abrasive tools as measured by taking a cross-sectional sample of the abrasive tool including all of its component abrasive portions and reinforcing members. In certain other embodiments, the percent thermal expansion is not greater than about 0.65%, such as not greater than about 0.6%, or even not greater than about 0.55%. Certain embodiments can have a percent thermal expansion that is within a range between about 0.3% and about 0.7%, such as between 0.3% and about 0.65%, or even more particularly between about 0.4% and about 0.65%.

Additionally, abrasive tools described herein have demonstrated improved grinding and cutting characteristics. For example, the abrasive articles of the embodiments herein demonstrated an improved G-ratio, which is a measure of the cubic volume of stock removal divided by the cubic volume of wear of the abrasive article, over conventional abrasive articles. Notably, for comparative purposes, the conventional abrasive articles included abrasives of the same design having the abrasive portion and reinforcing members. According to empirical evidence, the abrasive tools of the embodiments herein demonstrated a percent increase G-ratio of at least about 15% over conventional abrasive tools, wherein the percent increase is based on the equation (($G_N - G_C$)/$G_C$)×100%), wherein $G_N$ represents the G-ratio of an abrasive tool having large pores and small pores and $G_C$ represents the G-ratio of a conventional abrasive tool. In other embodiments, the percent increase of G-ratio is at least about 20%, such as at least about 25%, at least about 30%, at least about 35%, or even at least about 40%. Particular embodiments demonstrate a percent increase G-ratio within a range between about 15% and about 200%, such as within a range between about 15% and about 150%, and more particularly between about 15% and about 100%, and even more particularly between about 15% and about 75%.

EXAMPLES

Two types of abrasive articles were formed and tested to compare certain performance parameters; conventional samples (CS1) and novel samples according to embodiments herein (NS1). The CS1 samples are produced by forming an abrasive portion that includes mixing 65.31 wt % of abrasive grains of alumina and alumina-zirconia alloy grains with 34.7 wt % matrix material. The matrix material is formed of a mixture having approximately 57.3 vol % phenolic resin and a remainder amount comprising a mixture of pyrite fillers, aluminofluoride filler material, and moisture absorbing filler materials to aid the formation of the final-formed abrasive article. The mixture is then combined with layers of coated glass-fiber reinforcing members commercially available from IPAC within a forming chamber to form an abrasive preform. The abrasive preform is then pressed within the forming chamber at a pressure of 1.6 tons/in$^2$ at room temperature to form the final-formed abrasive article.

The NS1 samples are produced by forming an abrasive portion that includes mixing 62.2 wt % of abrasive grains of alumina with 31.5 wt % matrix material. The matrix material is formed of a mixture having approximately 72.8 vol % phenolic resin and a remainder amount comprising a mixture of pyrite fillers, aluminofluoride filler material, and moisture absorbing filler materials. The mixture is then combined with layers of coated glass-fiber reinforcing members commercially available from IPAC within a forming chamber to produce an abrasive preform. The abrasive preform is pressed within the forming chamber at a pressure of 0.64 tons/in$^2$ at room temperature to form the final-formed abrasive article.

Both types of samples are formed to have a 20 inch diameter (51 cm) and an average thickness of approximately 0.335 inches (0.85 cm). The CS1 and NS1 samples are then performance tested to compare their abrading efficiency by way of G-ratio. The G-ratio testing is conducted using a Braun cut-off saw, operating a 120 HP and 20,000 surface feet per minute of wheel speed. The workpiece is 1018 carbon steel of 1.5 inches bar stock fed at a rate of approximately 0.21 inches per second, and the testing is conducted by cutting one bar at a time for 200 cuts total. Three wheels are tested and evaluated for each of the samples types (CS1 and NS1).

Figure 5:
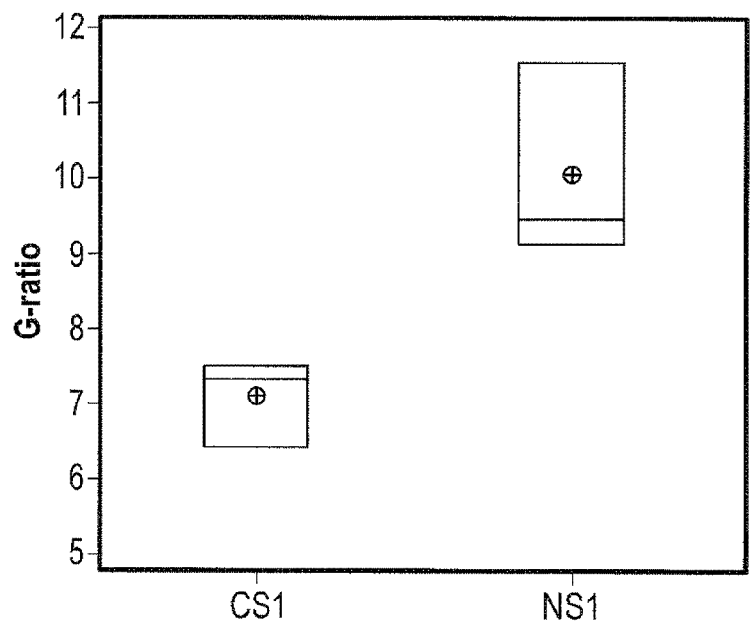
FIG. 5 includes a plot of G-ratio for a conventional abrasive tool and an abrasive tool of an embodiment.

FIG. 5 includes an illustration of a plot comparing the G-ratio of the CS1 and NS1 samples. As illustrated, the average G-ratio of the CS1 sample demonstrated a significantly lower G-ratio than the average G-ratio of the NS1 sample. In fact, the percentage increase in G-ratio based on the difference in the average G-ratio between the samples is approximately 30% greater for the NS1 sample over the CS1 sample. Accordingly, the samples formed according to embodiments herein demonstrated improved and more efficient abrasive capabilities over conventional abrasive articles.

The percent linear thermal expansion for the CS1 and NS1 samples were also tested as a way of measuring the expected thermal expansion during use of the article at high temperatures. Both samples were heated over a range of temperatures between 25° C. to 450° C. using an TMA-120 machine from Seiko Corporation. The samples were heated at a rate of 10° C./min.

Figure 6:
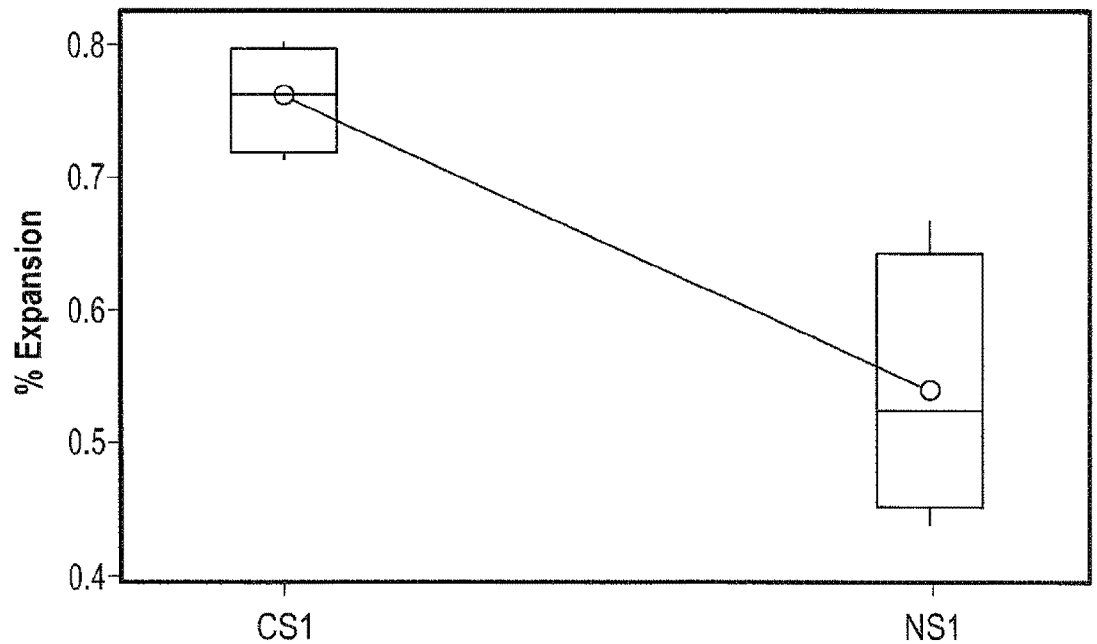
FIG. 6 includes a plot of linear thermal expansion for a conventional abrasive tool and an abrasive tool of an embodiment.

FIG. 6 includes an illustration of a plot comparing the linear percent thermal expansion for the CS1 and NS1 samples. As illustrated, the average percent thermal expansion for the CS1 samples were significantly higher than the percent linear thermal expansion of the NS1 samples. In fact, the CS1 samples demonstrated nearly a 30% increase in the average percent linear thermal expansion over the NS1 samples. Accordingly, the NS1 samples have a significantly lower thermal expansion, which makes them suitable for aggressive abrasive applications that generate significant temperatures and are more likely to avoid thermal-induced strains and failure during operations at high temperatures, particularly at interfaces between material components.

Additionally, FIG. 7, as described herein, includes a plot of pore size distribution for the sample NS1. As illustrated, the NS1 sample demonstrates a bimodal pore size distribution with a maxima at 310 microns representing the average small pore size and another distinct maxima at 4.61 mm representing the average large pore size.

The processes and abrasive articles disclosed herein represent a departure from the state-of-the-art. Abrasive articles herein can utilize a combination of features including abrasive portions having certain abrasive portions utilizing abrasive grains and a matrix material for forming abrasive structures having particular aspect ratios of diameter and thickness. Furthermore, abrasive articles of the embodiments herein can have a controlled porosity distribution, particularly a bimodal pore size distribution that includes large pores and small pores, which are thought to be responsible, at least in part, for improved performance characteristics. The large pores can be formed via natural pore-forming pathways through the formation of the abrasive article and evolution of gases, while the small pores may be formed via pore-forming materials, facilitating control of the porosity. Additionally, the abrasive articles of the embodiments can utilize other features such as reinforcing members that can include various features.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The Abstract of the Disclosure is provided to comply with Patent Law and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description of the Drawings, with each claim standing on its own as defining separately claimed subject matter.

What is claimed is:

1. A large diameter abrasive wheel comprising:
a body having an aspect ratio defined as a ratio between diameter to thickness of at least about 10:1, wherein the body includes:
an abrasive portion in the form of a layer and having abrasive grains contained within a matrix material and porosity characterized by a bimodal distribution of pores including large pores having an average large pore size ($P_l$), small pores having an average small pore size ($P_s$), and a percent difference between the average large pore size ($P_l$) and average small pore size ($P_s$) of at least 25% based on the equation $((P_l-P_s)/P_l)\times 100)$, wherein $P_l > P_s$, wherein the abrasive portion comprises between at least about 40 vol % and about 60 vol % of abrasive grains and between at least about 30 vol % and about 56 vol % of matrix material, and wherein the matrix material comprises between at least about 60 vol % and about 85 vol % of an organic material;
a first glass-fiber reinforcing member in the form of a layer distinct from the abrasive portion and contained within the body, wherein the first reinforcing member and the abrasive portion are in direct contact with each other at an interface extending through a diameter of the body;
a percent thermal expansion over a temperature range of 25° C. to 450° C. of not greater than about 0.7%.

2. The abrasive tool of claim 1, wherein the percent thermal expansion is not greater than about 0.65%.

3. The abrasive tool of claim 1, wherein the percent thermal expansion is within a range between about 0.3% and about 0.7%.

4. The abrasive tool of claim 1, wherein the percent difference between the average large pore size and average small pore size is within a range between about 75% and about 99%.

5. The abrasive tool of claim 1, wherein the difference between the average large pore size and average small pore size is at least an order of magnitude.

6. The abrasive tool of claim 1, wherein the small pores have an average small pore size ($P_s$) of not greater than about 0.70 mm.

7. The abrasive tool of claim 1, wherein the large pores have an average large pore size ($P_l$) of at least about 0.75 mm.

8. The abrasive tool of claim 7, wherein the large pores have an average large pore size ($P_l$) within a range between about 0.75 mm and about 10 mm.

9. The abrasive tool of claim 1, further comprising a second reinforcing member in the form of a layer distinct from the abrasive portion and contained within the body, wherein the first reinforcing member is separated from the second reinforcing member by the abrasive portion.

10. The abrasive tool of claim 1, wherein the first reinforcing member comprises an average thickness that is defined as the distance between a first major surface of the first reinforcing member and a second major surface of the first reinforcing member, and wherein the average thickness is less than 0.6 centimeters.

11. The abrasive tool of claim 10, wherein the average thickness of the first reinforcing member comprises at least about 3% of a total average thickness of the body.

12. The abrasive tool of claim 11, wherein the average thickness of the first reinforcing member is within a range between about 3% and about 15% of the total average thickness of the body.

13. A large diameter abrasive wheel comprising:
 a body having an aspect ratio defined as a ratio between diameter to thickness of at least about 10:1, wherein the body includes:
  an abrasive portion in the form of a layer and having abrasive grains contained within a matrix material and porosity characterized by a bimodal distribution of pores including large pores having an average large pore size ($P_l$) and small pores having an average small pore size ($P_s$), wherein the small pores have an average small pore size ($P_s$) of not greater than about 0.70 mm, wherein $P_l > P_s$, wherein the abrasive portion comprises between at least about 40 vol % and about 60 vol % of abrasive grains and between at least about 30 vol % and about 56 vol % of matrix material, and wherein the matrix material comprises between at least about 60 vol % and about 85 vol % of an organic material;
  a first glass-fiber reinforcing member in the form of a layer distinct from the abrasive portion and contained within the body, wherein the first reinforcing member and the abrasive portion are in direct contact with each other at an interface extending through a diameter of the body;
 a percent thermal expansion over a temperature range of 25° C. to 450° C. of not greater than about 0.7%.

14. A large diameter abrasive wheel comprising:
 a body having an aspect ratio defined as a ratio between diameter to thickness of at least about 10:1, wherein the body includes:
  an abrasive portion in the form of a layer and having abrasive grains contained within a matrix material and porosity characterized by a bimodal distribution of pores including large pores having an average large pore size ($P_l$) and small pores having an average small pore size ($P_s$), wherein the large pores have an average large pore size ($P_l$) of at least about 0.75 mm, wherein $P_l > P_s$, wherein the abrasive portion comprises between at least about 40 vol % and about 60 vol % of abrasive grains and between at least about 30 vol % and about 56 vol % of matrix material, and wherein the matrix material comprises between at least about 60 vol % and about 85 vol % of an organic material;
  a first glass-fiber reinforcing member in the form of a layer distinct from the abrasive portion and contained within the body, wherein the first reinforcing member and the abrasive portion are in direct contact with each other at an interface extending through a diameter of the body;
 a percent thermal expansion over a temperature range of 25° C. to 450° C. of not greater than about 0.7%.

15. The abrasive tool of claim 14, wherein the large pores have an average large pore size ($P_l$) within a range between about 0.75 mm and about 10 mm.

16. The abrasive tool of claim 13, further comprising a second reinforcing member in the form of a layer distinct from the abrasive portion and contained within the body, wherein the first reinforcing member is separated from the second reinforcing member by the abrasive portion.

17. The abrasive tool of claim 14, further comprising a second reinforcing member in the form of a layer distinct from the abrasive portion and contained within the body, wherein the first reinforcing member is separated from the second reinforcing member by the abrasive portion.

18. The abrasive tool of claim 13, wherein the average thickness of the first reinforcing member comprises at least about 3% of a total average thickness of the body.

19. The abrasive tool of claim 14, wherein the average thickness of the first reinforcing member comprises at least about 3% of a total average thickness of the body.

20. The abrasive tool of claim 13, wherein the first reinforcing member and the abrasive portion are in direct contact with each other at an interface extending through a diameter of the body.

* * * * *